(12) United States Patent
Woodard et al.

(10) Patent No.: US 8,636,890 B2
(45) Date of Patent: Jan. 28, 2014

(54) METHOD FOR REFURBISHING PTAL COATING TO TURBINE HARDWARE REMOVED FROM SERVICE

(75) Inventors: Nicholas Shawn Woodard, Monroe, OH (US); Michael H. Rucker, Loveland, OH (US); John Louis Cupito, Loveland, OH (US); Richard R. Worthing, Jr., Liberty Township, OH (US); Albert King, Milan, IN (US)

(73) Assignee: General Electric Company, Schenectady, NY (US)

( * ) Notice: Subject to any disclaimer, the term of this patent is extended or adjusted under 35 U.S.C. 154(b) by 164 days.

(21) Appl. No.: 13/242,548

(22) Filed: Sep. 23, 2011

(65) Prior Publication Data

US 2013/0075263 A1 Mar. 28, 2013

(51) Int. Cl.
| | |
|---|---|
| *C25D 17/00* | (2006.01) |
| *C25D 5/02* | (2006.01) |
| *C25D 5/34* | (2006.01) |
| *C25D 7/00* | (2006.01) |
| *B23P 6/00* | (2006.01) |
| *C25D 17/12* | (2006.01) |
| *F01D 5/00* | (2006.01) |
| *C23C 10/02* | (2006.01) |
| *C23C 10/58* | (2006.01) |
| *C25D 3/50* | (2006.01) |
| *F01D 5/28* | (2006.01) |

(52) U.S. Cl.
CPC .............. *B23P 6/002* (2013.01); *C23C 10/02* (2013.01); *C23C 10/58* (2013.01); *C25D 17/00* (2013.01); *C25D 17/12* (2013.01); *C25D 3/50* (2013.01); *C25D 5/02* (2013.01); *C25D 7/008* (2013.01); *F01D 5/005* (2013.01); *F01D 5/288* (2013.01)
USPC ........................................................ 205/115

(58) Field of Classification Search
USPC .......................................................... 205/115
See application file for complete search history.

(56) References Cited

U.S. PATENT DOCUMENTS

| 5,658,614 A | 8/1997 | Basta et al. |
| 6,080,246 A | 6/2000 | Wing |

(Continued)

FOREIGN PATENT DOCUMENTS

| CA | 2359342 C | 6/2008 |
| DE | 69509202 T2 | 9/1999 |

(Continued)

OTHER PUBLICATIONS

Search Report and Written Opinion from corresponding EP Application No. 12185530, dated Jul. 16, 2013.

*Primary Examiner* — Luan Van
*Assistant Examiner* — Ho-Sung Chung
(74) *Attorney, Agent, or Firm* — McNees Wallace & Nurick LLC

(57) ABSTRACT

A method of repairing damaged airfoils. The method comprises the steps of stripping thermal barrier coatings from the airfoil. After the coatings are removed, cracks are removed from the airfoil. Cracks that appear in the bond coat area over the airfoil fillet portion are removed by locally grit blasting the fillet portion of the airfoil. This operation also results in locally removing the bond coating from the fillet portion. Cracks and other damage sustained by the airfoil tip are removed and replaced by welding superalloy material. The airfoil then may be cleaned by thermal etching. The airfoil is then placed in a plating tool permitting preferential plating of airfoil areas from which plating has been removed. After plating, the airfoil is then heat treated to diffuse the platinum coating with the superalloy substrate materials. The diffusion heat treated airfoil is aluminided by any aluminiding process, forming a PtAl coating.

13 Claims, 5 Drawing Sheets

(56) References Cited

U.S. PATENT DOCUMENTS

| | | | |
|---|---|---|---|
| 6,165,345 | A | 12/2000 | Updegrove et al. |
| 6,376,801 | B1 * | 4/2002 | Farrell et al. .............. 219/124.34 |
| 2002/0011419 | A1 * | 1/2002 | Arao et al. .................... 205/333 |
| 2003/0082053 | A1 * | 5/2003 | Jackson et al. ................ 416/224 |
| 2005/0244274 | A1 * | 11/2005 | Wustman et al. ......... 416/241 R |
| 2006/0042933 | A1 * | 3/2006 | Rosenzweig et al. ......... 204/242 |
| 2006/0163323 | A1 * | 7/2006 | Pietruska et al. ............. 228/101 |
| 2006/0275624 | A1 | 12/2006 | Rucker |
| 2008/0066288 | A1 * | 3/2008 | Patrick et al. ................... 29/458 |
| 2008/0202938 | A1 | 8/2008 | Rao |
| 2008/0302667 | A1 * | 12/2008 | Rucker et al. ................. 205/233 |
| 2009/0035128 | A1 * | 2/2009 | Ahmad ......................... 415/177 |
| 2009/0117282 | A1 | 5/2009 | Arikawa et al. |
| 2010/0072072 | A1 * | 3/2010 | Beckel et al. ................. 205/118 |

FOREIGN PATENT DOCUMENTS

| | | |
|---|---|---|
| EP | 718420 B1 | 4/1999 |
| EP | 1076116 A1 | 2/2001 |
| EP | 821076 B1 | 11/2001 |
| EP | 787221 B1 | 5/2003 |
| EP | 1541714 A1 | 6/2005 |
| EP | 1627992 A2 | 2/2006 |
| EP | 1927672 A2 | 6/2008 |
| EP | 2309016 A1 | 4/2011 |
| GB | 2310435 A | 8/1997 |
| JP | 10183363 A | 7/1998 |
| WO | 9613622 A1 | 5/1996 |
| WO | 9903599 A1 | 1/1999 |
| WO | 2007142747 A2 | 12/2007 |

* cited by examiner

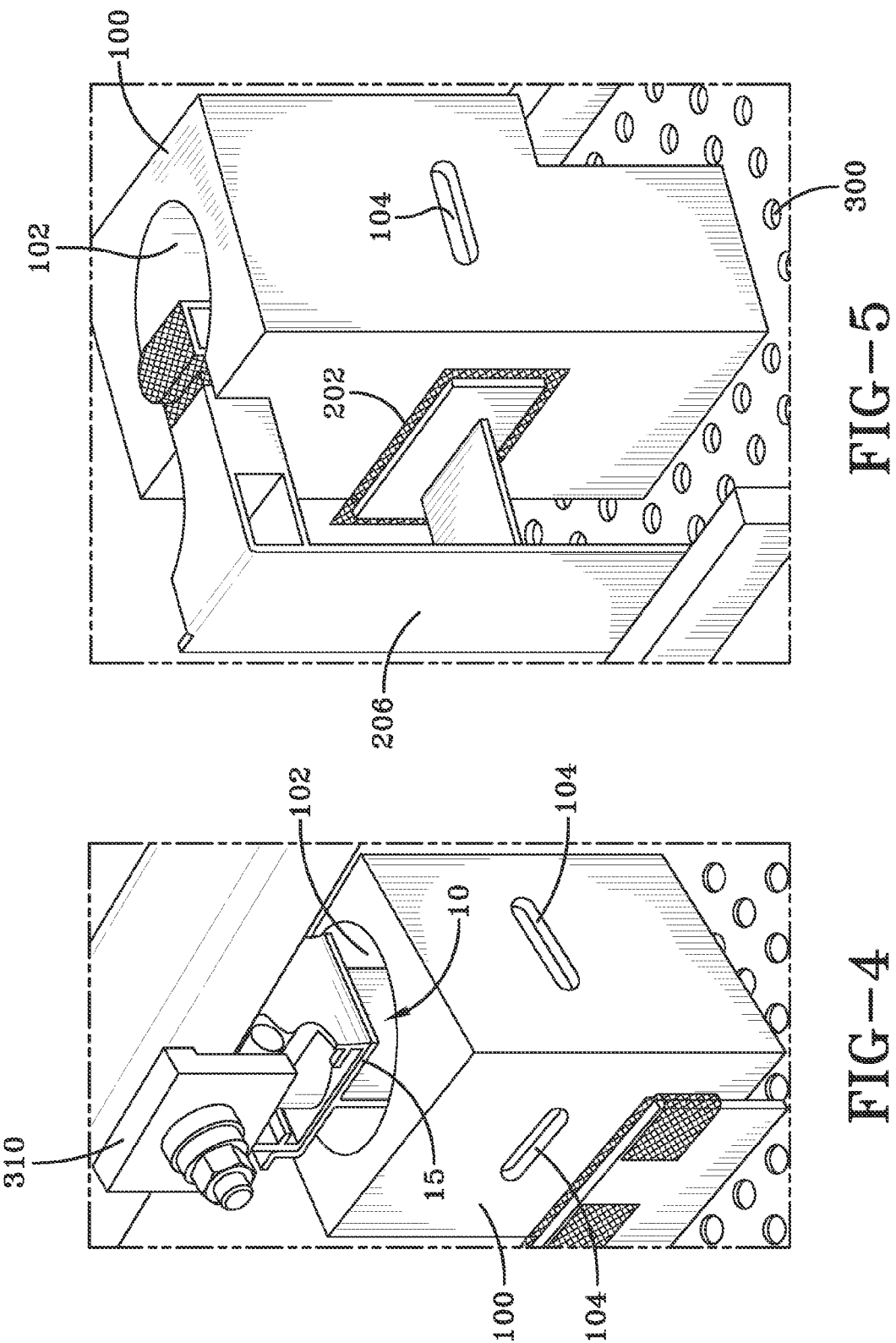

METHOD FOR REFURBISHING PTAL COATING TO TURBINE HARDWARE REMOVED FROM SERVICE

FIELD OF THE INVENTION

The present invention is generally directed to a method for refurbishing turbine hardware removed from service due to wear and/or cracking, and more specifically to partially removing PtAl coatings and reapplying PtAl coatings to areas of turbine airfoils such as blades removed from service, experiencing damage, such as at the blade fillet radii and tips.

BACKGROUND OF THE INVENTION

Some turbine hardware, such as turbine airfoils, operate under extreme conditions. Turbine airfoils, blades for example, operate in an oxidative, corrosive atmosphere of hot exhaust gases at temperatures that may approach or exceed the melting temperature of their base material, which base material is typically a high cost superalloy. The base material usually is covered with bond coating materials and thermal barrier coatings which provide improved temperature capability and corrosion/oxidation resistance to the blade made from the base material. The blades also rotate at high speeds subjecting them to high stresses.

As a result of these extreme operating conditions, turbine hardware such as turbine airfoils develop operationally induced imperfections at predictable locations after operating for predetermined periods of time. The life may be extended by removing the hardware from service and refurbishing the hardware to remove these imperfections before the imperfections can grow to a size at which repair is not practical. Because of the high cost of fabricating turbine blades, refurbishment is a viable option if it can be accomplished at reasonable costs.

Currently, these operationally induced imperfections, such as cracks, typically appear in the coating at the fillet radius and the tip of turbine airfoils, although in certain cases, the imperfections may occasionally appear in other locations. Current repair procedures entail aggressive grit blasting of the coated portion of the blade to remove any cracks followed by fully removing the coating from the airfoil, which coating may be platinum aluminide (PtAl). The coating is applied from the platform axially outward to the airfoil tip, the underside of the platform and the root not being coated. Because of the high temperatures of operation, diffusion of the elements of the superalloy and the PtAl occurs. The first step in refurbishment of the airfoils is a substantially complete removal of the coating, which is accomplished by placing the airfoil in a chemical bath and stripping the coating from the blade to remove the cracks. However, because of the diffusion that occurs between the superalloy and the coating, the chemical strip process results in removal of material that is thicker than the thickness of the coating as originally applied. This material removal may result in airfoil wall thicknesses that are thinner than allowed, resulting in scrapping of the airfoil and replacement with a new airfoil. If the airfoil wall minimum thickness is maintained, additional repairs may be accomplished.

What is desired is a process that can remove damaged areas from the airfoils without thinning the airfoil walls, thereby reducing the scrap rate of airfoils. A feature that has been sought in the art is the ability to reapply coating into preselected areas without exceeding the maximum allowed coating thickness on the blade, particularly if coating the preselected areas can be accomplished without the time consuming step of masking, as excessive coating may lead to embrittlement, stress concentration and more cracking.

SUMMARY OF THE INVENTION

A method of repairing airfoils damaged during operation and removed from service is provided. The method comprises the steps of stripping any thermal barrier coatings from the airfoil. After the thermal barrier coatings are removed, cracks are removed from the airfoil. Cracks usually appear in the bond coat area over the fillet portion of the airfoil, as this region is exposed to very high stresses. The cracks are removed by locally grit blasting the fillet portion of the airfoil to remove cracks from the fillet portion. This operation also usually results in locally removing the bond coating from the fillet portion. Cracks and other foreign-object induced damage may be sustained by the airfoil tip. The damage in this area usually requires removal of the airfoil tip, and the airfoil is then weld repaired by welding with superalloy material. The airfoil then may be cleaned by thermal etching, which is a cleaning operation performed by a high temperature heat treatment under a vacuum, removing oils and other processing fluids which reduce the possibility of undesirably oxidizing the airfoil materials. Platinum may then be plated over the airfoil where the bond coat was locally removed. This plating includes the replacement airfoil tip material and the fillet radius region. The localized plating is accomplished by minimally adding additional plating to airfoil regions that were not aggressively grit blasted. The airfoil is then diffusion heat treated to diffuse the platinum coating with the superalloy substrate materials. The diffusion heat treated airfoil is then aluminided by any aluminiding process to form a PtAl coating.

An advantage of the method set forth above for refurbishing PtAl coating to turbine hardware removed from service is that refurbishment can be accomplished while reducing the scrap rate of airfoils removed from service, since the method can remove the damaged coating in the fillet portion without causing excess thinning of the blade wall. Due to the high cost of such turbine airfoils, a successful repair and refurbishment instead of a replacement with a new airfoil results in significant cost saving.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 4 depicts a plating tool having a high pressure turbine blade inserted therein.

FIG. 5 is a view of the plating tool of FIG. 4 viewed 180° from FIG. 4, but with no blade inserted therein.

DETAILED DESCRIPTION OF THE INVENTION

A method of repairing airfoils damaged during operation and removed from service is provided. Airfoils may be damaged by various mechanisms, but all airfoils are subject to damage merely as a result of the environment in which they operate. For example, high pressure (HP) turbine blades operate in a high temperature, corrosive, oxidative environment while rotating at high speeds. These turbine blades are made from a base material of superalloys, typically nickel based superalloys, and provided with environmental coatings and thermal barrier coating (TBC's) that allow them to survive under these harsh conditions. Nevertheless, the HP turbine blades predictably sustain damage at their tips and at their fillet radii. Tip damage is predicable due to wear experienced by the blades, the hot exhaust gases at the tips and foreign object damage (FOD). Damage, in particular cracking, is predicable at the fillet radii due to the contour change and the high rotational speed resulting in high stresses at high temperatures of operation. A significant percentage of airfoils experience damage in this area, requiring repair.

Figure 1:
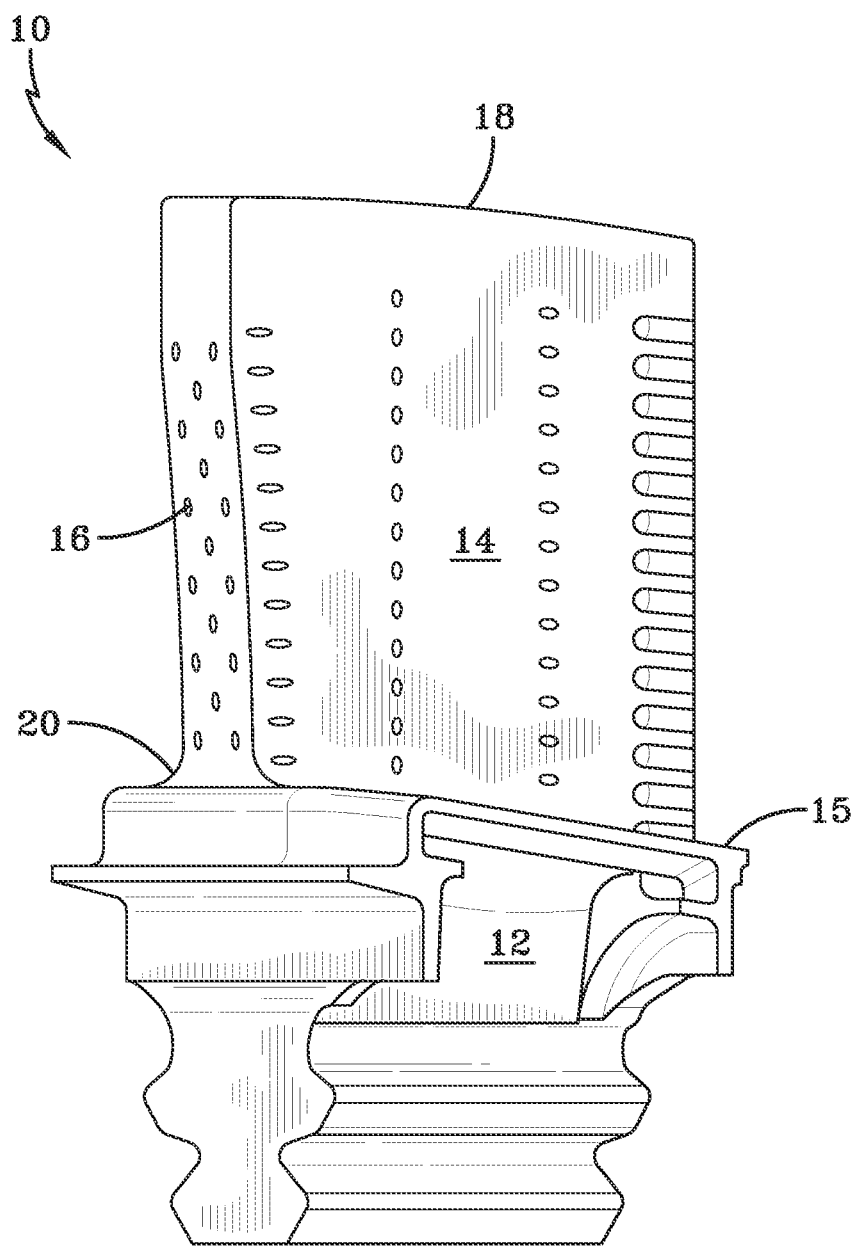
FIG. 1 depicts a high pressure turbine blade as an exemplary airfoil that may be removed from service for repair.

FIG. 1 depicts one type of airfoil, a high pressure turbine blade 10 that may be repaired by the current process. A typical high pressure turbine blade 10 includes a dovetail portion 12, an airfoil portion 14, a platform 15 separating airfoil portion 14 from dovetail portion 12, a tip portion 18 at an end of blade 10 opposite dovetail portion 12 and a fillet radius region 20 that provides a transition between platform 15 and airfoil portion 14. Also shown are cooling channels 16 that are fabricated into a high pressure turbine blade. Minimum wall thicknesses are established between the outer surface of the airfoil portion 14 and the cooling channels 16.

High pressure turbine airfoil 10 is coated with a bond coat, such as a PtAl coating that covers platform 15 on the airfoil portion side 14, fillet radius 20, airfoil portion 14 and tip portion 18. Dovetail portion 12 and the dovetail side of platform 15 usually is not coated with a coating. Overlying the bond coat in the tip portion 18 and at least an upper portion of the airfoil portion is a thermal barrier coating that improves the thermal performance of blade 10. Airfoils removed from service, such as high pressure turbine airfoil 10, typically sustain damage in tip portion 18 and in fillet radius 20. Tip portion damage may be from a number of mechanisms including FOD and wear from contact with mating shrouds, while damage in the fillet radius 20 may be cracks in the plating as the result of stresses resulting from rotation at elevated temperatures of operation.

Current methods of repair require removal of coatings from blade 10, removal of the damaged material in tip portion 18, replacement of the damaged material in tip portion 18, removal of cracks from fillet radius 20 and reapplication of coating(s). As discussed previously, removal of coatings is accomplished by a chemical removal process that may result in removal of too much material, resulting in thinning of blade 10 that causes walls that are too thin, so that the blade must be scrapped.

Figure 2:
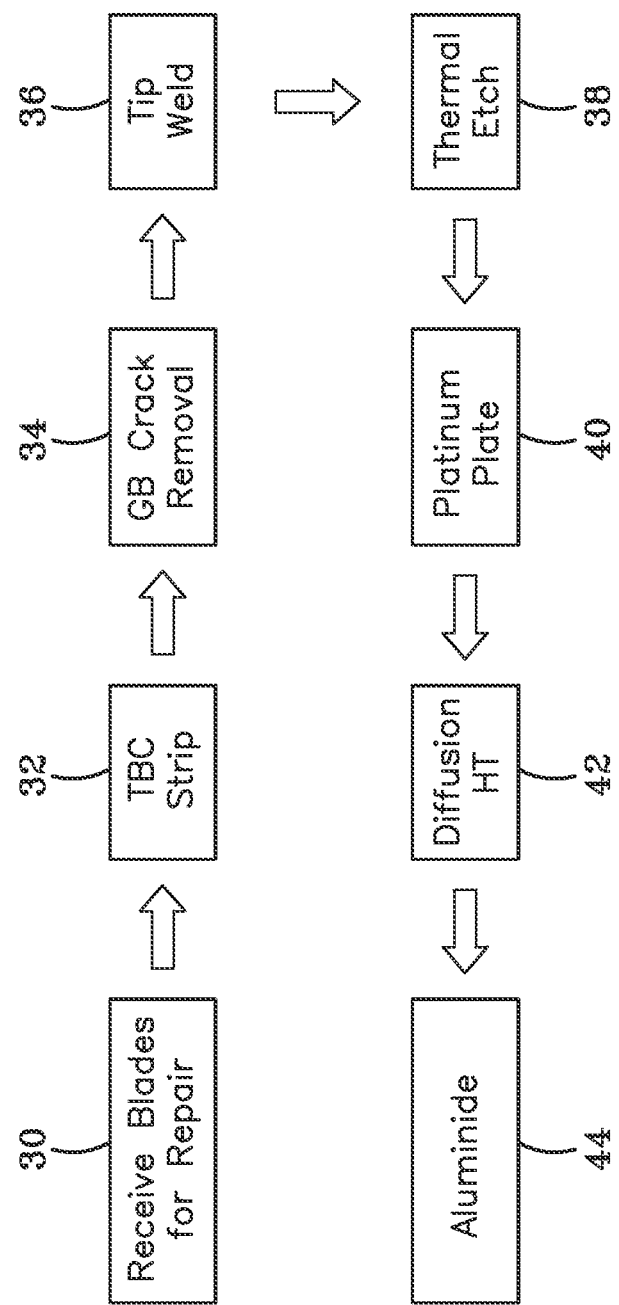
FIG. 2 is a flow chart of the repair process of the present invention.

Referring now to FIG. 2, which is a flow chart of the present method, the method comprises the steps of inspecting blades removed from service and receiving damaged blades for repair 30. Then, thermal barrier coatings are stripped from the airfoil 32 using conventional methods for removing TBCs. The airfoils are again inspected for damage. This inspection, which further identifies and characterizes damage, may be a visual inspection or a penetrant inspection, which is well suited to identify tight cracks, or both. Cracks are then removed from the airfoil by grit blasting 34. Cracks usually appear in the bond coat area over fillet radius 20 of the airfoil, as this region is exposed to very high stresses. The cracks are removed by locally grit blasting fillet radius 20 of the airfoil to remove cracks from fillet radius 20. This operation also usually results in locally removing the bond coating from fillet radius 20. Cracks and other foreign-object induced damage may be sustained by tip portion 18. The damage in this area usually requires removal of tip portion 18. The airfoil tip portion is then provided with replacement superalloy material by welding or other metal replacement processes 36. If damage does not require removal and replacement of tip material and damage is restricted to cracks in tip portion 18, cracks may be removed by locally grit blasting tip portion 18. The airfoil may then be thermally etched 38. Platinum may then be plated 40 over the airfoil where the bond coat was locally removed by an electrolytic plating process. This plating includes plating the replacement airfoil tip portion 18 or exposed airfoil portion substrate as well as fillet radius 20. The localized plating is accomplished by minimally adding additional plating to airfoil portions that were not aggressively grit blasted, but more fully plating those portions that were aggressively grit blasted, or tip portions 18 that required removal and replacement of material. The airfoil is then diffusion heat treated 42 to diffuse the platinum coating with the superalloy substrate materials. The diffusion heat treated airfoil is then aluminided by any aluminiding process 44, although a standard vapor phase aluminiding process is preferred.

Figure 3:
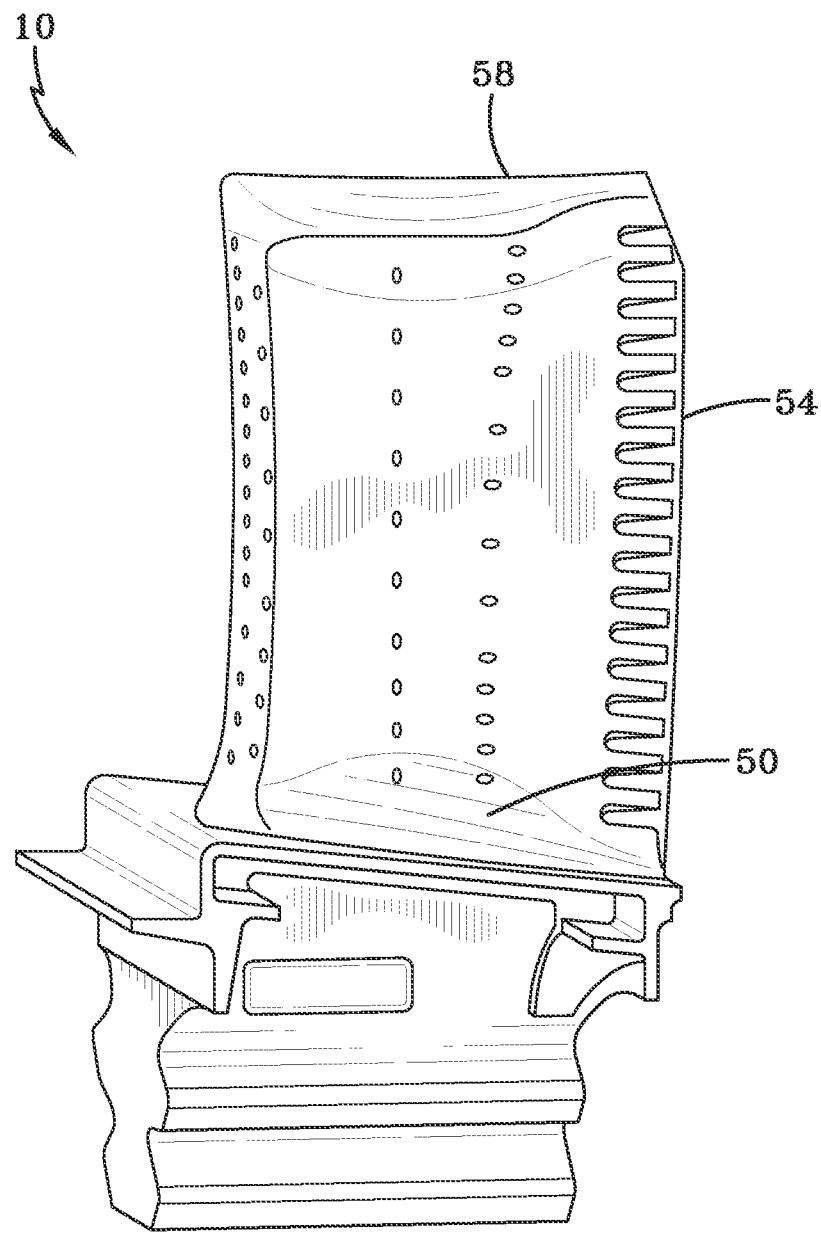
FIG. 3 depicts a high pressure turbine blade from which damaged regions have been removed.

FIG. 3 depicts a high pressure turbine blade 10 from which damaged regions have been removed in accordance with the present invention. TBCs were removed from blade 10 by standard removal methods. One standard method immerses the airfoil in an inorganic hydroxide bath having a high concentration of alkali or alkaline earth hydroxide at an elevated temperature for a time sufficient to effect detachment of the thermal barrier coating for removal from the substrate and bond coat. The airfoil then optionally can be immersed in a water bath to remove any remaining thermal barrier coating. This process affects thermal barrier coating removal without detectable damage to the substrate or any bond coat which may be present. The fillet radius 50 was then aggressively grit blasted to remove cracks that may have developed in this region during service. Grit blasting may be targeted to a specific region, here fillet radius 50. Grit blasting accomplishes the removal of any bond coats, such as PtAl, which may be present in fillet radius 50. After removal of bond coats, the exposed substrate material is inspected to assure that any defects, typically hairline cracks, are removed from fillet radius 50, although frequently the cracks have not yet propagated into the substrate material.

In FIG. 3, the blade tip, which usually is damaged as a result of normal operation in a turbine engine, is removed by a machining operation. The blade tip is then restored by a tip weld repair and contour machining, as is well known in the art. As will be apparent to one skilled in the art, initial inspection of the tip may disclose insufficient damage to require tip portion 58 removal and superalloy replacement. However for about 80% or more of blades removed from service, tip removal and tip replacement by weld repair is required without the necessity for grit blasting of the tip.

While grit blasting of fillet radius 50 may be focused to remove bond coating, the grit blasting currently cannot be focused so as not to affect the bond coat in adjacent airfoil portion 54. So, airfoil portion 54 depicted in FIG. 3 may be hard-masked with a masking material that will protect adjacent airfoil portion 54 from the aggressive grit blasting prior to accomplishing the grit blasting. Without the protection afforded by the hard masking, grit blasting may be sufficiently intense to undesirably remove all plating in airfoil portion 54 as well as expose superalloy material producing wall thinning that can result in scrapping of the airfoil. So prior to the aggressive grit blasting, airfoils surfaces, and in particular airfoil surfaces adjacent the fillet radius, are masked using a hard-masking technique to prevent inadvertent damage to the airfoil. While airfoil portion 54 is grit blasted, grit blasting occurs during a pre-plating grit blast procedure. This pre-plating grit blast is not as aggressive as the crack-removal grit blast, the pre-plating grit blast increasing surface roughness while removing about 25-30% of the originally applied coating.

FIGS. 4-7 set forth the method and apparatus for replacing the bond coating that was removed in grit blasting, step 34, that removes cracks from the fillet radius 50 or weld removal and replacement of tip portion, step 36. This method and apparatus enables restoration of bond coating material over the exposed superalloy material at grit blasted fillet radius 50 and tip portion 58 to original coating dimensions without applying excessive amounts of bond coating material to airfoil portion 54. As used herein, the term excessive amounts of bond coating material and excess coating thickness means coating in excess of that allowed by design. This coating thickness typically is specified on drawings or in specifications and will vary among designs, depending upon considerations such as airfoil configuration, stress levels and the like. For example, drawing requirements for a turbine blade for use on a commercial jet, such as the Boeing 737, require a coating thickness not to exceed 4 mils (0.004"), that is the maximum coating thickness permitted is 4 mils. It is undesirable to apply coating in the required areas to the maximum allowable along the fillet radius and the airfoil tip portion, because, even though coating thickness along the fillet radius and airfoil tip portion will be within tolerance, some additional plating will be deposited adjacent these regions, the amount of plating decreasing with increasing distance from these regions, as discussed below. Thus, to avoid exceeding the maximum allowable coating thickness in the adjacent regions, the applied electrolytic coating during the plating operation in the uncoated regions is targeted for about 0.2 mils (0.0002"). After aluminiding, this provides coating of sufficient thickness to protect the base metal and properly function as a bond coat in the filet radius region and at the airfoil tip portion, while also limiting the amount of coating added to the regions of the airfoil adjacent the filet radius region and the airfoil tip portion, so that maximum coating thickness remains within the design limits, here 4 mils.

FIG. 4 depicts a high pressure turbine blade 10 inserted into a plating tool 100. In its broadest manifestation, a plating tool comprises a non-conductive fixture 101, FIG. 6. The fixture has a first end, an opposed second end and a periphery extending 360° between the first end and the second end. The first end includes a cavity extending into an interior of the fixture. There is at least one opening or slot 104 in the periphery of the fixture providing fluid communication between the cavity and an exterior. This opening permits electrolytic fluid to circulate freely between the cavity and exterior so that electrolytic fluid on the interior does not become depleted during plating operations. At least one mesh screen is positioned adjacent a surface located within the interior of the cavity and forms part of the anode. As used herein, "anode" means the bottom half of the non-conductive fixture, including openings therein, as well as any mesh screens, that form a part of the platform circuit, which screens control current flow, and hence plating deposition, to the workpiece. The non-conductive fixture impedes current flow except through its openings, where current may flow unimpeded from the anode to the workpiece or cathode. The amount of plating deposited on the workpiece is governed by the current flow and the resulting current density. Preferably, the surface to be plated is located on a workpiece that is inserted into the interior of the cavity which is dimensioned to receive the workpiece. The at least one mesh screen is positioned adjacent a portion of the workpiece that is to be plated. The plating tool may include a means for suspending the airfoil within the non-conductive fixture, although the means for suspending may be external. For example, the plating tool may be positioned in a plating bath, and hangers for the workpiece may be located outside the plating bath and over the workpiece. Alternatively, the workpiece may include a flange-like surface that enables it to be suspended on a top surface of the non-conductive fixture. A power supply is provided to enable electroplating of the workpiece in the tool. The power supply does not comprise the plating tool, but is necessary to accomplish electroplating as is known in the art. Electrical connections from the power supply, the mesh screens forming the conducting portions of the anode, and a cathode are required for plating, and the power supply must be energized to accomplish electroplating, the workpiece being the cathode.

Plating parameters are the same as standard electroplating operations. However, plating is selectively applied to that portion of the workpiece immediately adjacent the opening. Although plating is applied to other areas of the workpiece (unless masked), the amount of plating decreases rapidly with increasing distance from the opening and from the anode positioned adjacent the opening.

Figure 6:
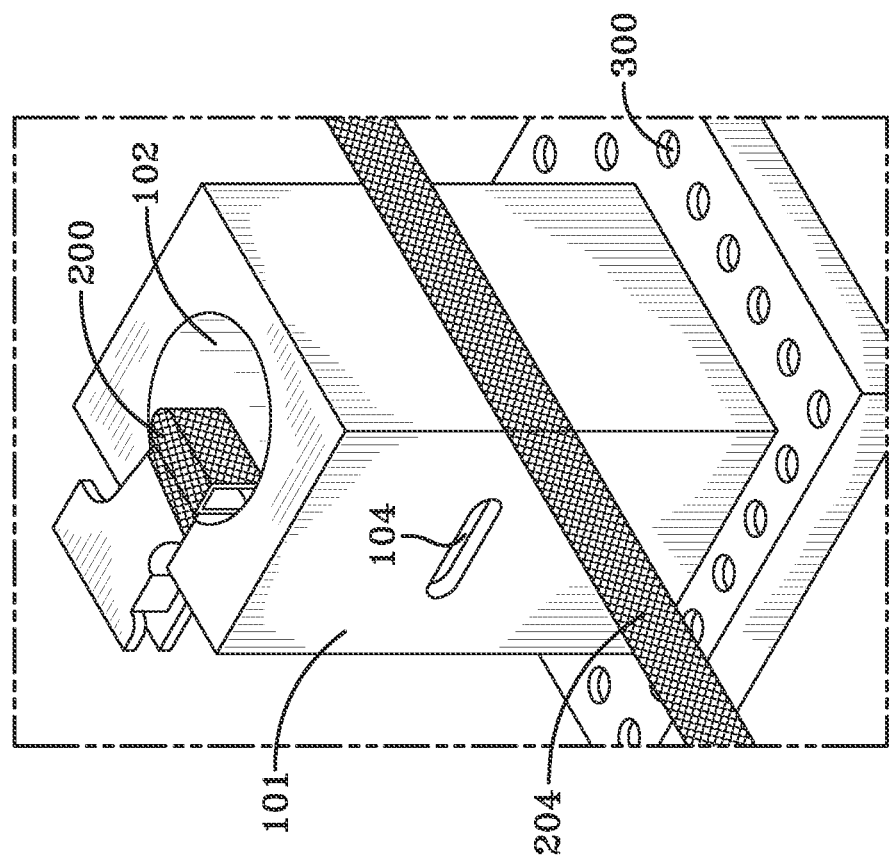
FIG. 6 is a view of the plating tool of FIG. 4 viewed 90° counterclockwise from FIG. 4, but with no blade inserted therein.

Referring again to FIG. 4, blade 10 is assembled to a first fixture 310 that maintains the blade in an inverted position with the tip portion 58 positioned downward and the dovetail portion facing upward and attached to fixture 310. Plating tool 100 is fabricated of a soft, machinable plastic block. Kynar®, a polyvinylidene fluoride (PVDF) available from Arkema, Inc, King of Prussia, Pa. is a preferred plastic block. FIG. 5 depicts a view of plating tool 100 at an orientation 180° from the view of FIG. 4, but without a high pressure turbine blade inserted therein. FIG. 6 depicts plating tool 100 rotated 90° counterclockwise of FIG. 4 and with no high pressure turbine blade inserted therein. As will become evident, plating tool 100 is design-specific for each type of airfoil and is engine specific. Thus a high pressure turbine blade will require a different plating tool than a low pressure turbine blade, and a high pressure turbine blade from an engine for a Boeing 747 aircraft, such as a GE-90, will require a different plating tool than a high pressure turbine blade from an engine for a Boeing 737 aircraft.

FIG. 6 clearly shows a cavity 102 substantially centered in plating tool 100. Cavity 102 is also visible in FIGS. 4 and 5. Also visible in FIG. 6 is a fillet radius plating mesh screen 200. Fillet radius plating mesh screen 200 has a convex shape formed to carefully mirror the concave shape of fillet radius 50 when high pressure turbine blade 50 is assembled into cavity 102 as depicted in FIG. 4. FIGS. 4, 5, and 6 show plating tool assembled onto a perforated table 300, which table may be movable so that plating solution can be brought up to the position of blade platform 15 when assembled as shown in FIG. 4, by lowering the table into the plating solution.

Figure 7:
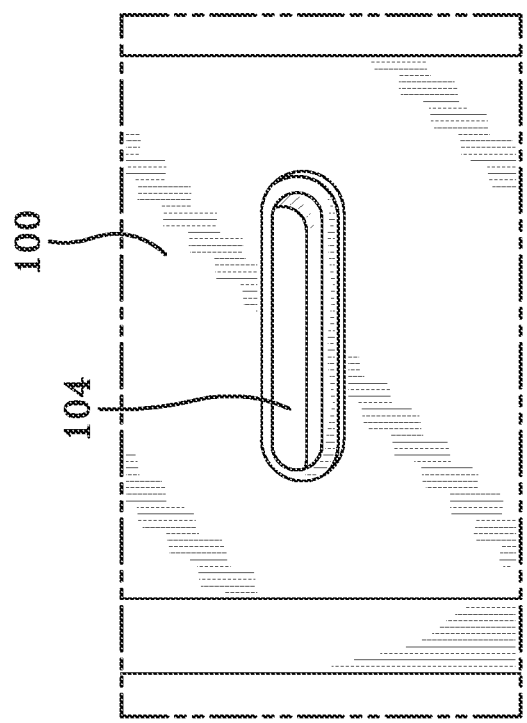
FIG. 7 is a view of a side of the plating tool of FIG. 4, clearing disclosing a circulation slot.

As is most clearly evident in FIG. 7, which is side view of plating tool 100 of FIG. 4, a circulation slot 104 is formed in the side of plating tool 100. A circulation slot 104 exists on each face of plating tool 100, as also shown in FIGS. 4, 5 and 6. Once plating tool 100 is immersed into a plating solution, circulation slots 104 provide access into the cavity 102 so that plating solution can circulate from the exterior of plating tool 100 into cavity 102, and around the airfoil, which prevents the plating solution within cavity 102 from becoming depleted adjacent to blade tip portion 18, which blade tip is positioned within cavity 102 adjacent to circulation slot 104.

FIG. 5 and FIG. 6 depict mesh screen 202 and 204 respectively. As depicted in FIG. 5, mesh screen 202 adjacent tip portion is held in place by second fixture 206, which fixture also provides an electrical connection to fillet radius plating mesh screen 200. FIG. 6 also shows mesh screen 204. Since a plurality of plating tools may be assembled to perforated table 300 simultaneously, mesh screen 204 may extend across the plurality of plating tools 100 and adjacent to a plurality of circulation slots 104 so that a plurality of airfoils may be plated simultaneously.

In operation, once blade 10 is assembled to first fixture 310 and inserted into cavity 102 of plating tool 100, and the mesh screens are properly assembled into position adjacent to plating tool 100 and blade 10, electrical connections are fitted so that blade 10 is the cathode. Blade 10 and plating tool 100 are then immersed into a plating bath of platinum electrolyte. Mesh screens are electrically connected to the power supply are positioned adjacent to the portions of blade 10 requiring plating, fillet radius 50 and tip portion 10. DC current from a power supply is then applied, causing plating to deposit on the cathode. Because electron density decreases with increasing distance from the mesh screen, those portions of blade 10 closest to the mesh screen will have the thickest deposit of plating although non-conductive fixture 101 will restrict current flow as previously described. Some plating will be deposited on other portions of the blade in the solution, namely platform 15 and airfoil portion 54, but because the electron density is reduced, the amount of plating deposited will decrease with increasing distance from the mesh screen. If plating thickness is a concern because plating may be too thick in either airfoil portion 54 or platform 15, masking may be applied to any area of the blade in which excess coating thickness is a concern.

After the platinum is applied, the platinum-coated blade may be removed from the fixture and processed in accordance with the procedure set forth above and in FIG. 2.

Thus, in a preferred embodiment, the plating tool is for use in plating an airfoil. It is used to insert an airfoil into a plating bath. The tool is designed for use with a specific airfoil, as the size of the airfoil will vary from one location to another. For example, the high pressure turbine blades are the smallest turbine blades and the low pressure turbine blades are the longest turbine blades. Furthermore, different engines will have airfoils of different sizes. For example, a military engine will likely have a smaller high pressure turbine blade than that of a commercial airliner. Thus the tool is custom matched to a specific airfoil.

The plating tool comprises a non-conductive fixture having a first end, an opposed second end with a periphery extending 360° between the first end and the second end. The fixture may assume any shape, although rectangular and square are most preferred. The first end includes a cavity that extends into an interior of the fixture. The cavity is dimensioned to receive an airfoil portion of an airfoil. Alternatively stated, the cavity is custom machined to accommodate airfoils of a predetermined size. Ideally, the cavity receives the filet radius of the airfoil with the tip extending into the cavity. The non-conductive fixture includes at least one opening in the periphery of the fixture, providing fluid communication between the cavity and an exterior. Most preferably, the at least one opening is positioned within the fixture so that it is adjacent the airfoil tip. The opening enables fluid to flow freely from the exterior of the fixture into the cavity, which is important in preventing depletion of electrolytic solution during the plating process.

Although the tool in its simplest embodiment only requires one mesh screen adjacent an opening in the non-conductive fixture, a mesh screen should be positioned adjacent every surface that is to be plated, and an opening should also be positioned there as well. Since the fillet radius portion of the airfoil requires plating after refurbishment, a first mesh screen having a convex shape that mirrors the concave shape of the fillet is positioned adjacent the fillet radius portion of the airfoil. In FIG. 4, the first mesh screen is shown located within the cavity of the fixture so that the first mesh screen is adjacent the fillet radius portion when an airfoil is inserted into the cavity, but the first mesh screen location is not so limited. At least one second mesh screen is positioned adjacent the at least one opening in the non-conductive fixture 101, the mesh screen and fixture 101 adjacent the airfoil tip, so that the airfoil tip will be plated. In the embodiment shown, there are four openings depicted, but the fixture is not so limited, as fewer or more openings may be provided. In a most preferred embodiment, a mesh screen is provided adjacent each opening.

In order to accomplish electroplating, in addition to an electroplating solution, a power supply with electrical connections from the power supply to the mesh screen and to the workpiece, when a workpiece (airfoil) is inserted into the cavity, is required. The airfoil is the cathode in this electrical circuit. The mesh screen may be attached to the non-conductive piece at the preselected locations of the plating tool, that is adjacent position of the fillet radius portion of the airfoil, when installed, and immediately adjacent the openings, or they may be suspended adjacent these areas of the tool.

A means for suspending the airfoil and the non-conductive fixture into a plating bath is required so that an underside of the airfoil platform is out of contact with the plated solution, when the fillet radius is in contact with the plating solution. This may be done in a number of ways. In one embodiment, as shown, the tool may sit on a platform movable to different depths in the plating solution, while the airfoil is suspended from an overhead device that can be lowered into the tool cavity until the tip portion and the fillet radius portion are opposite their respective anodes. In another embodiment, both the tool and the airfoil are suspended from an overhead device, with the airfoil inserted into the tool cavity, and each is lowered into the electroplating solution until the airfoil tip portion and airfoil fillet radius are opposite their respective anodes. In still another embodiment, the airfoil is positioned on the non-conductive fixture so that the platform portion rests across the top surface of the fixture, while the bottom of the non-conductive fixture rests on the movable perforate platform. The tip portion of the blade and the root radius portion of the blade are opposite their respective mesh screens. The fixture and the airfoil can be lowered into the electroplating solution to a sufficient depth such that the fillet radius portion is positioned in the electrolytic solution and the platform portion is positioned outside of the solution or so that just the side of the platform portion adjacent the fillet radius portion is just in contact with the plating solution. Of course, any other means may be used.

For a high pressure turbine blade such as used in the Boeing 737 aircraft, after inserting the blade and the plating tool into a plating bath of a platinum electrolytic solution, current is applied at an amperage of about 0.25 amps for about one hour. This rate of application permits adequate control of thickness for a reasonable time. It will be understood by those skilled in the art that a higher amperage will require a shorter time, and a lower amperage will require a longer time. However, a high pressure turbine blade plated using the plating tool of the present invention using the exemplary time and current resulted in nominal plating thicknesses of about 0.2 mils (0.0002") at the airfoil tip portion and at the fillet radius portion of the blade, that is, the areas of the blade that had been repaired as described above. The areas of the airfoil adjacent the repaired areas exhibited an increase of coating thickness of no more than 0.1 mils (0.0001"). When the power supply is energized, the charge distribution is substantially uniformly spread along the surface of the cathode (here the turbine blade). The increased plating thickness at the airfoil tip portion and along the fillet radius portion is the direct result of the anode and placement with respect to the airfoil. Anode tailor the amount of current drawn to the cathode (turbine blade) through the use of shielding, provided by the non-conductive fixture of the plating tool and the mesh screen.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of repairing damaged airfoils removed from service, comprising the steps of:
   stripping thermal barrier coatings from the airfoil;
   locally grit blasting a fillet radius portion of the airfoil to remove cracks from the fillet portion, while locally removing a bond coating from the fillet;
   removing damaged material from an airfoil tip portion;
   replacing superalloy material on the airfoil tip portion;
   thermally etch the airfoil;
   applying platinum plating over the locally removed bond coat and over the replaced superalloy material;
   diffusion heat treating the platinum plated airfoil;
   vapor phase aluminiding the airfoil to form a PtAl coating over the applied platinum coating;
   wherein the step of applying platinum plating over the replaced superalloy material on the airfoil tip portion and over the grit blasted fillet portion of the airfoil includes placing the airfoil in a plating tool that selectively coats and restores plating thickness to the airfoil tip portion and the fillet radius portion of the airfoil;
   wherein the plating tool further includes a first mesh screen adjacent the fillet radius portion of the airfoil and at least one second mesh screen adjacent the airfoil tip portion;
   further including applying power to the airfoil from a power supply, wherein platinum plating is applied from a plating solution to the airfoil tip portion and to the fillet radius portion of the airfoil, plating also being applied to regions of the airfoil in the plating solution adjacent the airfoil tip portion and the fillet radius portion, the amount of plating applied to the adjacent regions decreasing with increasing distance from the mesh screen, the amount of plating deposited adjacent the tip portion being further restricted by at least one opening in the plating tool adjacent the tip portion.

2. The method of claim 1 wherein the plating tool includes a non-conductive fixture that has a cavity that receives the airfoil.

3. The method of claim 1 wherein the plating tool is non-conductive.

4. The method of claim 3 wherein the non-conductive fixture comprises a machinable, plastic block.

5. The method of claim 4 wherein the machinable plastic block further comprises polyvinyl fluoride.

6. The method of claim 3 wherein the non-conductive fixture includes at least one opening adjacent the airfoil tip portion.

7. The method of claim 6 wherein the plating tool further including locating a mesh screen adjacent the fillet radius portion of the airfoil and the airfoil tip portion.

8. The method of claim 7 further including a means for suspending the plating tool and the airfoil in the plating solution so that the airfoil tip portion and the fillet radius portion of the airfoil are in contact with the plating solution.

9. The method of claim 1 further including connecting a power supply to the mesh screen and to the airfoil, wherein the airfoil is a cathode.

10. The method of claim 1 further including a steps of cleaning the airfoil and inspecting the airfoil for cracks after stripping the thermal barrier coatings from the airfoil and prior to the step of locally grit blasting.

11. The method of claim 10 wherein the step of inspecting for cracks includes a visual inspection.

12. The method of claim 10 wherein the step of inspecting for cracks includes a penetrant inspection.

13. The plating tool of claim 2 further including a power supply, the power supply having electrical connections to at least one anode, and a cathode, wherein the workpiece is the cathode.

* * * * *